United States Patent
Mizusako et al.

(10) Patent No.: US 8,094,100 B2
(45) Date of Patent: Jan. 10, 2012

(54) LASER LIGHT SOURCE DEVICE, VIDEO DISPLAY DEVICE

(75) Inventors: Kazuhisa Mizusako, Chino (JP); Kiyoto Sudo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 635 days.

(21) Appl. No.: 12/333,772

(22) Filed: Dec. 12, 2008

(65) Prior Publication Data

US 2009/0153447 A1 Jun. 18, 2009

(30) Foreign Application Priority Data

Dec. 13, 2007 (JP) ................................. 2007-322266

(51) Int. Cl.
  *G09G 3/30* (2006.01)
(52) U.S. Cl. ............... 345/77; 345/48; 345/690; 345/39
(58) Field of Classification Search .................. None
  See application file for complete search history.

(56) References Cited

U.S. PATENT DOCUMENTS

| 2005/0219229 A1* | 10/2005 | Yamaguchi | 345/173 |
| 2006/0279710 A1* | 12/2006 | Tani | 353/85 |
| 2009/0021455 A1* | 1/2009 | Miller et al. | 345/77 |

FOREIGN PATENT DOCUMENTS

JP  A-05-095148  4/1993

* cited by examiner

*Primary Examiner* — Muhammad N Edun
(74) *Attorney, Agent, or Firm* — Oliff & Berridge, PLC

(57) ABSTRACT

A laser light source device which is used for a video display device displaying video by using plural image frame data inputted from an image generating device includes a laser light source emitting laser light, a drive circuit driving the laser light source, a target light amount acquisition unit that acquires a target light amount which is a light amount necessary for displaying the image frame data, an output light amount detecting unit that detects an output light amount of the laser light source device, a control unit that controls the drive circuit so that the output light amount will be the target light amount, and a determination unit that determinates deterioration of the laser light source by using drive conditions of the drive circuit with respect to at least two different target light amounts at the time of control.

13 Claims, 11 Drawing Sheets

| BLACK FRAME | PRESCRIBED LIGHT AMOUNT |
|---|---|
| $BF_1$ | $P_{11}$ |
| $BF_2$ | $P_{12}$ |
| $BF_3$ | $P_{13}$ |
| ... | ... |

LASER LIGHT SOURCE DEVICE, VIDEO DISPLAY DEVICE

BACKGROUND

1. Technical Field

The invention relates to a laser light source device and a video display device including the laser light source device.

2. Related Art

A video display device which displays video by irradiating a spatial light modulator such as a light valve, digital mirror device (DMD) and the like with illumination light of a light source device is utilized. In the video display device, for example, a laser light source device emitting laser light is used.

In the laser light source device, there is the one in which an automatic power control (APC) circuit for controlling drive conditions such as temperature and voltage is used for keeping constant light output regardless of temperature change of the laser light source device.

An example of the related art includes JP-A-5-95148.

However, when the laser light source device is driven in the same drive conditions as before deterioration in the case that the laser light source device deteriorates, voltage exceeding allowable voltage is applied to a drive circuit of the laser light source device for outputting a target light amount set by the APC. As a result, a problem that failures occur in the laser light source device and useful life thereof is shortened.

SUMMARY

An advantage of some aspects of the invention is to determine deterioration of the laser light source and to control output at the time of deterioration.

Aspects of the invention can be realized as the following embodiments or application examples.

Application Example 1

A laser light source which is used for a video display device displaying video by using plural image frame data inputted from an image generating device includes a laser light source emitting laser light, a drive circuit driving the laser light source, a target light amount acquisition unit that acquires a target light amount which is a light amount necessary for displaying the image frame data, an output light amount detecting unit that detects an output light amount of the laser light source device, a control unit that controls the drive circuit so that the output light amount will be the target light amount and a determination unit that determinates deterioration of the laser light source by using drive conditions of the drive circuit with respect to at least two different target light amounts at the time of control.

According to the laser light source device of the Application Example 1, deterioration determination can be performed by using change characteristics of drive conditions at the time of control calculated by using at least two different drive conditions at the time of controlling the drive circuit, that is, a gradient, therefore, it is possible to catch the deterioration state of the laser light source device with high accuracy.

In the laser light source device of Application Example 1, the determination unit determines the deterioration when the drive conditions with respect to target light amounts are not included in a reference conversion efficiency range which has been previously prescribed.

According to the laser light source of Application Example 1, the deterioration of the laser light source device can be determined based on whether the drive conditions are included in the reference conversion efficiency range or not. Therefore, it is possible to catch the deterioration state of the laser light source device by a simple system configuration.

The laser light source device of Application Example 1 further includes a storage unit that stores plural device conditions and a calculation unit that calculates slope efficiency indicating output efficiency of the laser light source by using plural drive conditions stored in the storage unit, in which the reference conversion efficiency range is a prescribed range including a reference slope efficiency which has been previously prescribed and the determination unit determines deterioration when the calculated slope efficiency is not included in the reference conversion efficiency range.

According to the laser light source device of Application Example 1, the slope efficiency indicating efficiency in which power is converted into laser light is used, therefore, it is possible to suppress incorrect determination of deterioration due to effects of noise and the like and to catch the deterioration state of the laser light source device with high accuracy.

The laser light source of Application Example 1 further includes a decision unit that decides whether the drive conditions with respect to respective plural kinds of light amounts which have been previously prescribed are stored in the storage unit, in which the calculation unit performs calculation of the slope efficiency in the case that at least two drive conditions are stored.

According to the laser light source device of Application Example 1, the calculation of the slope efficiency is performed in the case that drive conditions with respect to plural kinds of light amounts which have been previously prescribed are stored. Therefore, it is possible to calculate slope efficiency by simple configuration with high accuracy.

In the laser light source of Application Example 1, the drive condition includes a voltage value or a current value which is necessary for outputting laser light.

According to the laser light source of Application Example 1, it is possible to acquire drive conditions easily and to reduce processing burden of the laser light source device.

Application Example 2

A video display device includes the laser light source of Application Example 1, an image frame data acquisition unit that acquires plural image frame data from an image generating device, a target light amount calculation unit that calculates a target light amount which is a light amount necessary for displaying the image frame data, a transfer unit that transfers the target light amount to the laser light source device and a video display unit that displays video by using the acquired image frame data and output light from the laser light source controlled in accordance with the target light amount.

According to the video display device of Application Example 2, the video display device having the laser light source device which is capable of catching the deterioration state with high accuracy can be realized.

The video display device of Application Example 2 further includes a maximum light amount acquisition unit that acquires the maximum light amount which can be outputted by the laser light source by using output light amounts of the laser light source and a characteristic table in which drive conditions necessary for outputting prescribed light amounts are previously registered in accordance with the deterioration state of the laser light source device, in which the target light amount calculation unit calculates the target light amount to be transferred to the laser light source based on the acquired maximum light amount.

According to the video display device of Application Example 2, the target light amount can be calculated based on the maximum light amount which changes in accordance with the deterioration state of the laser light source device. Therefore, excessive application of voltage to the laser light source device can be suppressed, therefore, it is possible to suppress failures of the laser light source device as well as to prolong useful life.

In the video display device of Application Example 2, a red laser light source device for outputting red light, a green laser light source device for outputting green light and a blue laser light device for outputting blue light are included as the laser light source device, in which the target light amount calculation unit calculates the target light amount so that the white balance of output lights from the respective laser light source devices is maintained to be a fixed state.

According to the video display device described in Application Example 2, it is possible to control output of the laser light source device while maintaining the white balance of output lights to be a fixed state. Therefore, failures of the laser light source device can be suppressed as well as reduction of video quality can be suppressed.

In the video display device of Application Example 2, the output light amount acquisition unit acquires output light amounts of the respective laser light sources, and the target light amount calculation unit calculates target light amounts of the laser light sources of respective colors so that the white balance of the output lights from the laser light sources of respective colors is maintained to be a fixed state in accordance with the output light amount of the laser light source whose reduction ratio of the acquired output light amount is largest with respect to the output light amount at a previously prescribed certain point in the laser light sources of respective colors.

According to the video display device of Application Example 2, it is possible to calculate target light amounts of laser light source devices of all colors in conjunction with the change of the output light amount of the laser light source device whose reduction rate of the output light amount is largest. Therefore, the output change due to the deterioration state of one laser light source device can be reflected on other laser light source devices. Accordingly, it is possible to suppress the reduction of video quality.

The video display device of Application Example 2 further includes a black frame decision unit that decides whether the image data frame transmitted from the image generating device is a black frame in which all pixel data is set to be black, in which the laser light source device further includes a storage unit that stores a prescribed drive condition which is previously prescribed drive condition of the laser light source device when it is determined that the frame is the black frame, and a calculation unit that calculates slope efficiency by using the prescribed drive condition.

According to the video display device of Application Example 2, it is possible to store the drive condition with respect to the previously prescribed given light amount when the received image data frame is the black frame. Therefore, even when displaying still images and the like in which the luminance variation is small in image data frames, the slope efficiency can be calculated by the simple configuration, therefore, it is possible to catch the deterioration state of the laser light source device to control output light amounts.

The video display device of Application Example 2 further includes a light amount storage unit that stores the maximum light amount of each image data frame acquired by the maximum light amount acquisition unit, in which the black frame decision unit makes a decision by using the maximum light amount of each image data frame stored in the light amount storage unit.

According to the display device of Application Example 2, it is possible to decide the black frame by the simple configuration.

In addition to the above laser light source device and the video display device, the invention can be configured as a deterioration determination method of the laser light source device and a drive control method of the video display device. The invention can also be configured in various forms such as a computer program that realizes the deterioration determination and drive control, a recording medium in which the program is recorded, and data signals including the program and embodied in a carrier wave. The above described various additional elements can be applied to the respective forms. In the case that the invention is configured as the computer program, the recording medium in which the program is recorded and the like, the program can be configured as a program that controls the laser light source device and the video display device as a whole or as part of the program performing the functions of the invention. As the recording media, various media which can be read by a computer, for example, a flexible disc, a CD-ROM, a DVD-ROM, a punch card, a printed matter on which codes such as barcodes are printed, an internal storage device (a memory such as ROM or ROM) and an external storage device of a computer. In the invention, the above-described various examples can be applied by being combined appropriately or omitting part thereof.

BRIEF DESCRIPTION OF THE DRAWINGS

The invention will be described with reference to the accompanying drawings, where like numbers reference like elements.

FIG. 11 is an explanatory view illustrating prescribed light amounts at the time of black frame insertion.

DESCRIPTION OF EXEMPLARY EMBODIMENTS

A. First Embodiment

A1. System Outline

Figure 1:
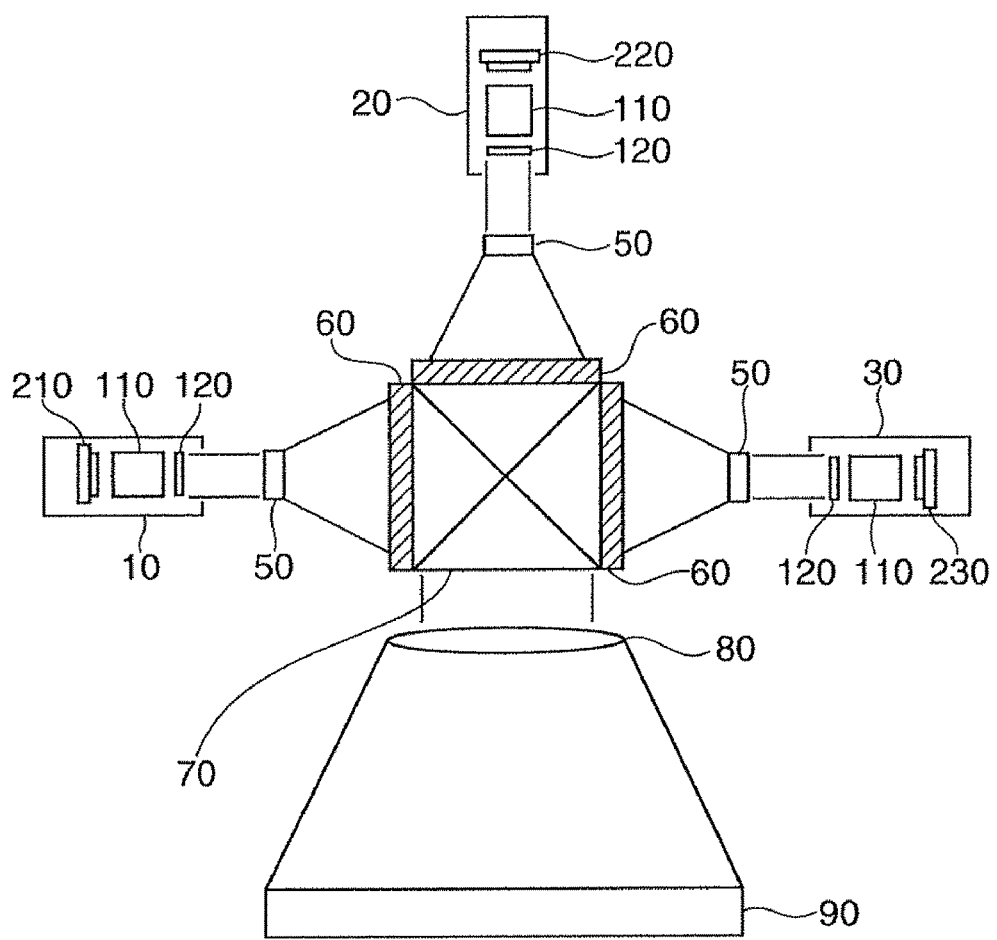
FIG. 1 is an explanatory view illustrating a schematic structure of a projector according to First Embodiment.

A projector as a video display device according to First Embodiment will be explained with reference to FIG. 1. FIG. 1 is an explanatory view illustrating a schematic structure of a projector according to First Embodiment.

As shown in FIG. 1, a projector 1000 includes light source devices 10, 20, and 30, equalizing optical devices 50, spatial light modulation devices 60, a dichroic prism 70 and a projection lens 80.

The light source devices 10 to 30 are used as light sources of the projector 1000. The light source device 10 includes a laser light source 210, a second harmonic generation device 110, a resonator 120, outputting red laser light having a wavelength of approximately 650 nm. The light source device 20 includes a laser light source 220, the second harmonic generation device 110 and the resonator 120, outputting green laser light having a wavelength of approximately 540 nm. The light source device 30 includes a laser light source 230, the second harmonic generation device 110 and the resonator 120, outputting blue laser light having a wavelength of approximately 430 nm. Since the laser light is absorbed in various devices in the light source device, the amount of light outputted from the laser light source device is slightly different from the amount of light used for projection of images. The detailed structure of the light source devices 10 to 30 will be described later.

The equalizing optical devices 50 uniformalize luminance unevenness by superimposing incident irradiated light to reduce the light amount difference between end portions and the center portions of a screen. It is possible to project bright images on the whole screen by arranging the equalizing optical devices 50. As the equalizing optical device 50, for example, a computer-generated hologram (CGH) which is a diffraction optical element can be used.

The spatial light modulation device 60 (light valve) includes an active matrix-type transmissive liquid crystal panel which is formed by using high temperature poly-silicon (HTPS) and a polarizing plate. The spatial light modulation device 60 displays images by controlling incident light.

The dichroic prism 70 has a structure in which four triangular prisms are combined to be a rectangular solid, forming an image by combining red laser light, green laser light and blue laser light transmitted through the spatial light modulation devices 60 and projecting the image on the projection lens 80.

The projection lens 80 projects the image projected by the by dichroic prism 70 on a screen 90.

As described above, the projector 1000 forms an image by allowing emitted lights from the light source devices 10 to 30 to be incident to the spatial light modulation devices 60 corresponding to respective light source devices, then, combines emitted lights to project the image on the screen 90. The viewer visually recognize the image projected on the screen 90.

A2. Block Structure

Figure 2:
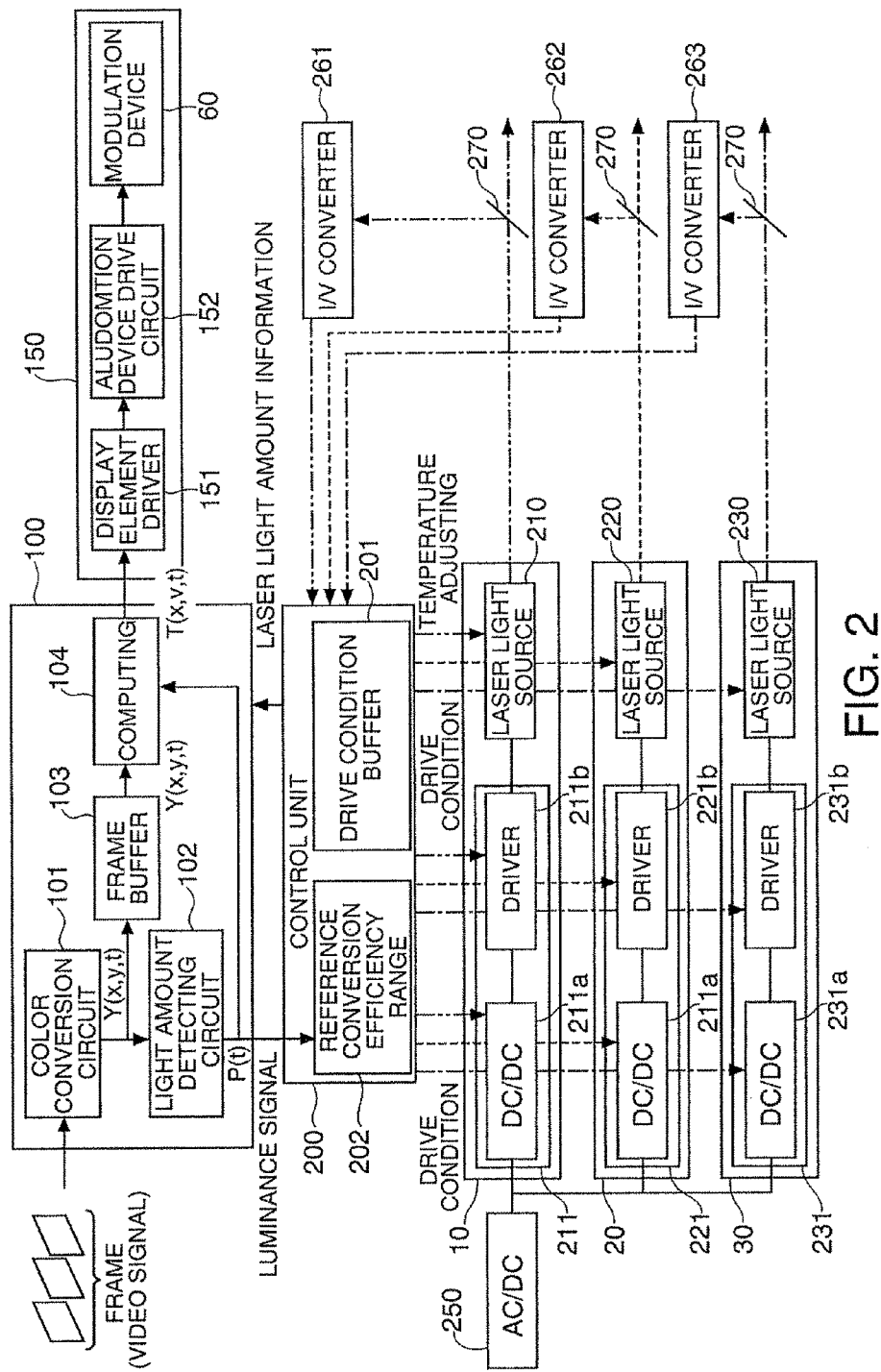
FIG. 2 is an explanatory diagram illustrating a block structure of the projector according to First Embodiment.

FIG. 2 is an explanatory view illustrating a block structure of the projector 1000 according to First Embodiment. The projector 1000 includes a video processing circuit 100 processing a video signal, a display unit 150 driving spatial light modulation devices based on the video signal, laser drive circuits 211, 221 and 231, laser light sources 210, 220 and 230, a control unit 200 controlling the laser light sources, an AC/DC power source 250 and I/V converters 261, 262 and 263.

The video processing circuit 100 includes a color conversion circuit 101, a light amount detection circuit 102, a frame buffer 103 and a transmittance computing circuit 104.

The color conversion circuit 101 receives a luminance signal (hereinafter, the luminance signal inputted by each frame indicating an image is referred to as merely a "frame" in First Embodiment) inputted by each frame indicating an image from an image generating device connected to the projector 1000, performing calculation of luminance distribution Y(x, y, t) of one frame and computing the while balance or gamma characteristics (γ characteristics). In the luminance distribution Y(x, y and t), (x, y) represents coordinates of a pixel in a frame, y represents a frame number showing the order of the frame. The color conversion circuit 101 accumulates pixel data of inputted frames in the frame buffer 103.

The light amount detection circuit 102 stores the maximum control light amounts of respective laser light sources 210, 220 and 230 as the maximum light amounts which can be outputted by respective laser light sources 210, 220 and 230. The maximum control light amount indicates the light amount of appropriately 70% of the maximum light amount (light amount at a rollover point) which can be outputted by each laser light source. The light detecting circuit 102 calculates a target light amount P(t) indicating the light amount which is necessary for displaying the frame based on the luminance distribution Y(x, y, t) of one frame by using the stored maximum control light amounts. The target light amount indicating the light amount which is necessary for displaying the frame can be set based on, for example, the light amount which is necessary for outputting the maximum luminance value of plural image data included in the frame. In First Embodiment, the light amount which is necessary for outputting the maximum luminance value of plural image data included in the frame is set as the target light amount P(t), Hereinafter, the target light amount P(t) is also referred to as a "the maximum light amount of the frame" in embodiments.

The transmittance computing circuit 104 calculates transmittance T(x, y, t) of the spatial light modulation device 60 based on pixel data of one frame and the target light amount P(t). The transmittance T(x, y, t) is calculated from the following formula 1.

$$T(x,y,t)=Y(x,y,t)/P(t) \quad \text{Formula 1}$$

The display unit 150 includes a display element driver 151, a modulation device drive circuit 152 and the modulation device 60. The display element driver 151 controls the modulation device drive circuit 152 based on the transmittance determined by the transmittance computing circuit 104. The modulation device drive circuit 152 adjusts the transmittance by driving the spatial light modulation device 60.

The laser light source 210 of the light source device 10 is a semiconductor laser, outputting laser light of having a peak wavelength of approximately 1300 nm which is twice as long as approximately 650 nm as the peak wavelength of the red laser light. The laser light source 220 of the light source device 20 outputs laser light of a peak wavelength of approximately 1080 nm which is twice as long as approximately 540 nm as the peak wavelength of green laser light, and the laser light source 230 of the laser light source device 30 outputs laser light of a peak wavelength of approximately 860 nm which is twice as long as approximately 430 nm as the peak wavelength of blue laser light. The laser lights outputted from respective laser light sources 210, 220 and 230 are radiated by the second harmonic generation devices 110 (FIG. 1) and the resonators 120 (FIG. 1) as laser lights having peak wavelengths of approximately 650 nm, 540 nm and 430 nm respectively.

The I/V converter 261 includes a not-shown photo diode (PD) and an I/V conversion circuit. The photo diode detects the light amount of branch light branched by a dichroic mirror 270 which divides outputted light from the laser light source 210, and the I/V conversion circuit converts a current value flowing in the circuit into a voltage value in accordance with the detected light amount by the photo diode. The I/V converters 262, 263 are associated with the laser light sources 220, 230 respectively, having the same function/structure of the I/V converter 261.

The control unit 200 includes a drive condition buffer 201 and a reference conversion efficiency range storage unit 202. The control unit 200 has a temperature adjusting function for adjusting the temperature of each laser light source (not shown). In the drive condition buffer 201, drive conditions of the laser light sources 210, 220 and 230 at the time of outputting prescribed target light amounts are stored. In the reference conversion efficiency range storage unit 202, the reference conversion efficiency range in which drive conditions in the prescribed light amounts at the time of normal operation (not deterioration time) is stored. The control unit 200 performs APC so as to satisfy the target light amount in accordance with the target light amount of the frame and the output amount of laser light source device as well as determines deterioration of the laser light source, notifying the maximum light amount which can be oscillated by the laser light source device with respect to the video processing circuit. In First Embodiment, the drive conditions represent voltage values applied to the laser drive circuits 211, 221, 231 of the laser light sources 210, 220 and 230 at the time of outputting the prescribed target light amount.

The laser drive circuit 211 includes a DC/DC controller 211a and a laser drive driver 211b. The laser drive circuit 211 controls output of the laser light source device in accordance with an APC instruction from the control unit 200. The laser drive circuits 221, 231 have the same function/structure as the laser drive circuit 211.

As described above, the projector 1000 can display video which can be visually recognized by a viewer by controlling drive of the laser light sources 210, 220 and 230 and the drive of the spatial light modulation devices 60 in parallel.

A3. Maximum Control Light Amount Resetting Processing

Figure 3:
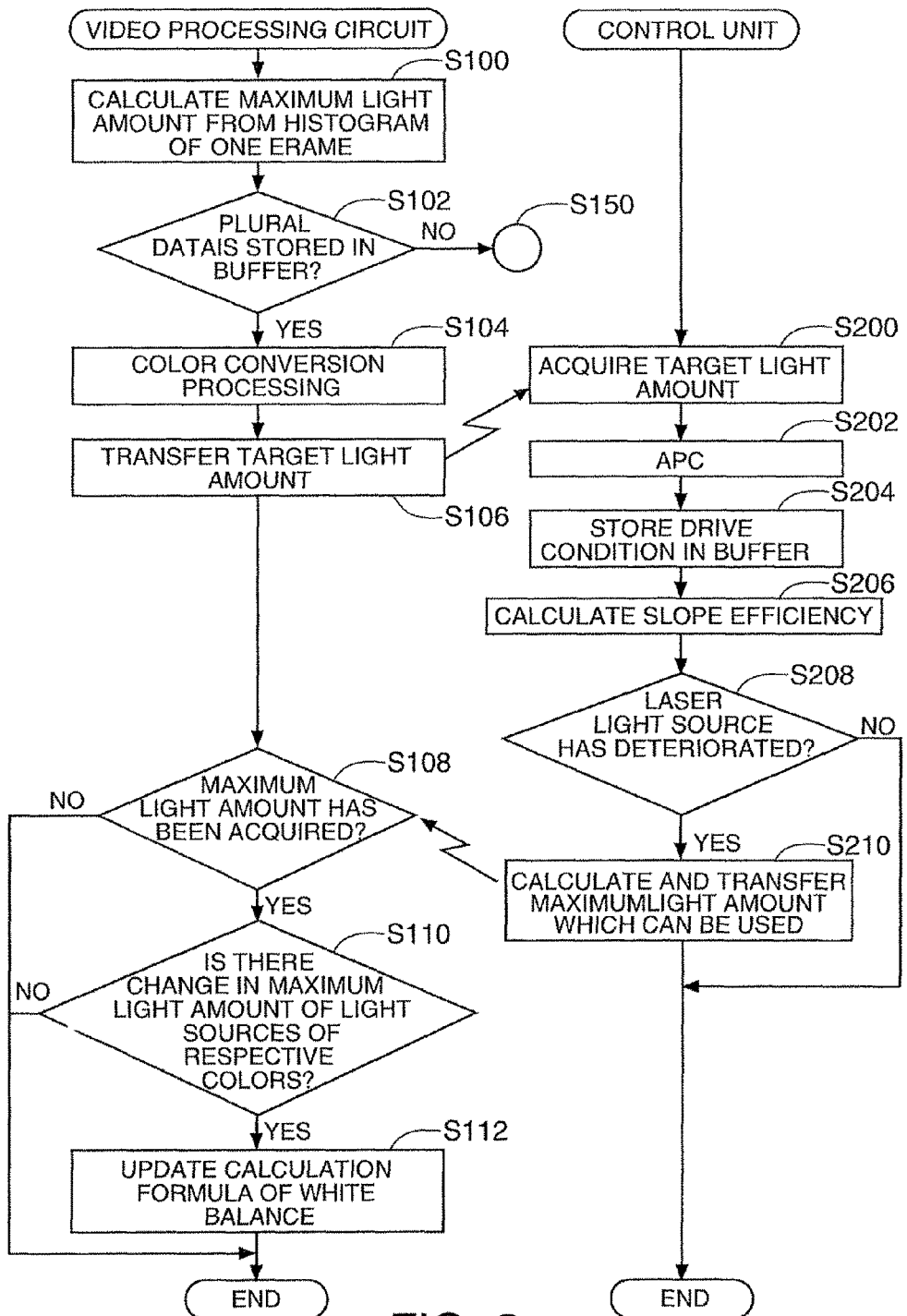
FIG. 3 is a flowchart explaining maximum control light amount resetting processing according to First Embodiment.
Figure 4:
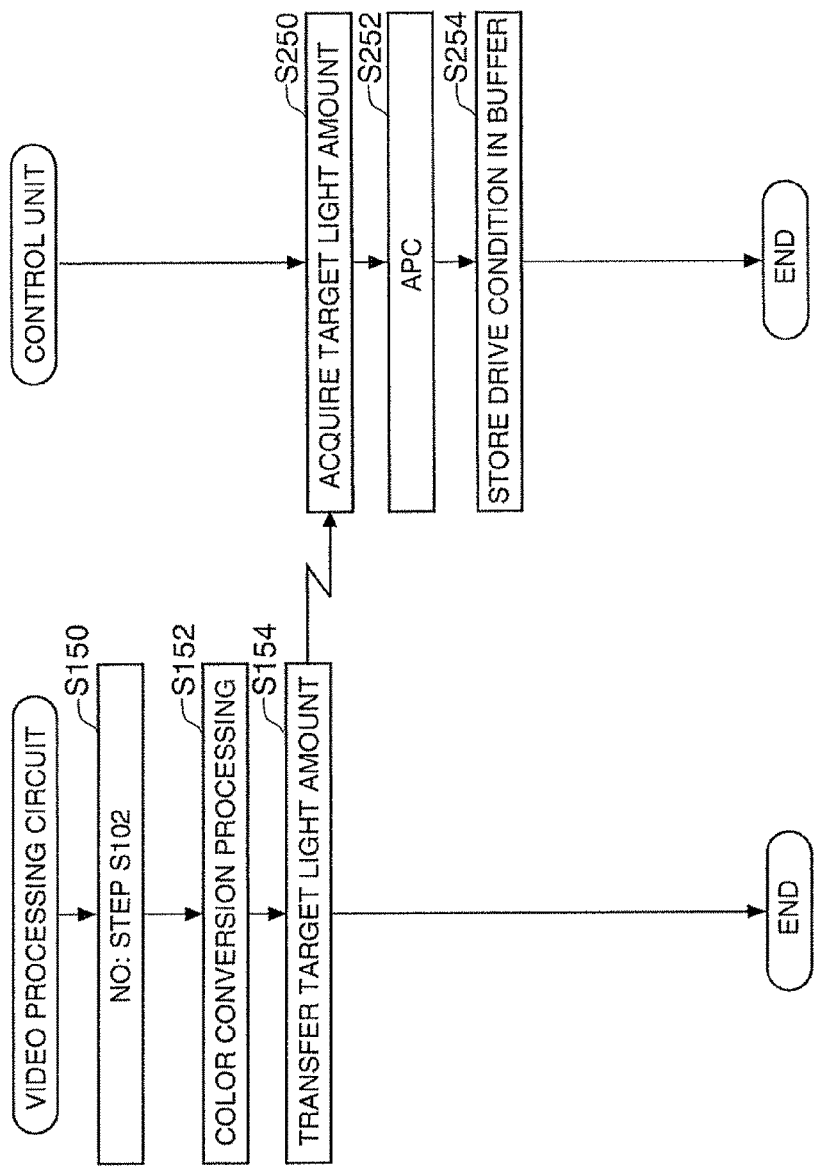
FIG. 4 is a flowchart explaining maximum control light amount resetting processing according to First Embodiment.
Figures 5A, 5B:
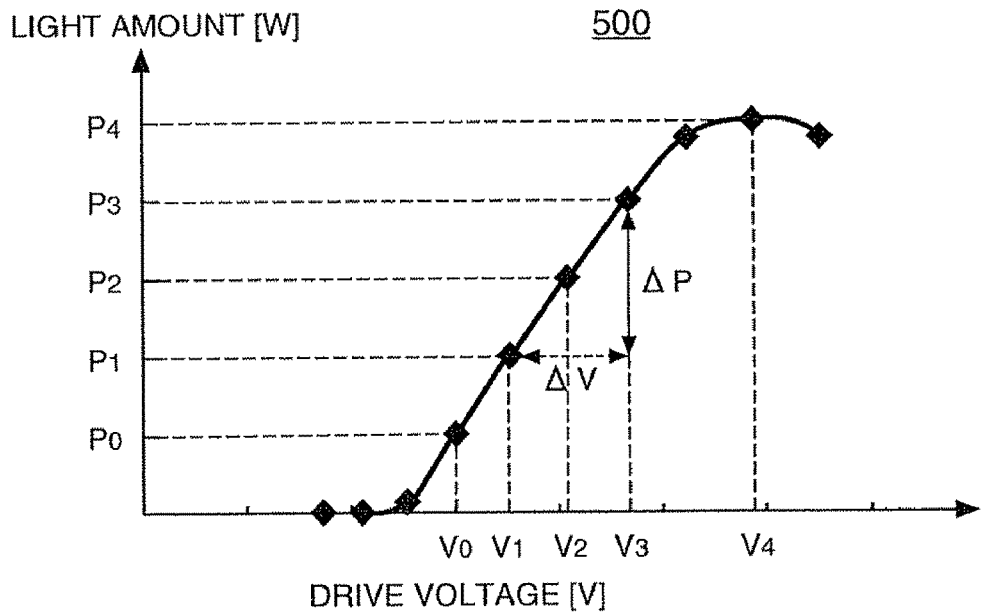
FIG. 5A and FIG. 5B are explanatory views illustrating storage of drive conditions according to First Embodiment.
Figure 6:
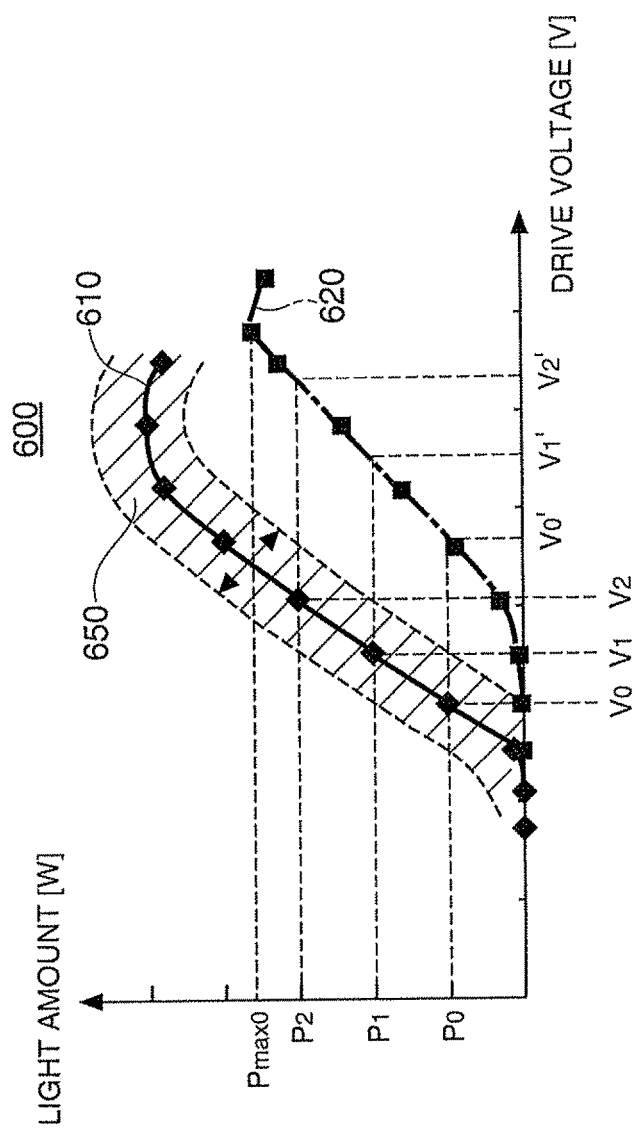
FIG. 6 is an explanatory view explaining deterioration determination according to First Embodiment.

The deterioration determination and the maximum control light amount resetting processing will be explained with reference to FIG. 3 to FIG. 6. FIG. 3 and FIG. 4 are flowcharts explaining the maximum control light amount resetting processing according to First Embodiment. FIG. 5A and FIG. 5B are explanatory views illustrating storage of drive conditions according to First Embodiment. FIG. 6 is an explanatory view explaining deterioration determination according to First Embodiment.

The video processing circuit 100 calculates a target light amount which is the light amount necessary for outputting the maximum luminance value of a frame from a histogram indicating the luminance distribution of luminance values of pixels included in one frame (Step S100), determining whether plural drive conditions are stored in the drive condition buffer (Step S102). The video processing circuit 100 performs calculation of the white balance and the γ correction (Step S104) when plural drive conditions are stored in the buffer (YES: Step S102), transferring the target light amount calculated in Step S100 to the control unit 200 (Step S106).

When the control unit 200 acquires the target light amount (Step S200), performs APC by using the target light amount and the output light amount of the laser light source (Step S202). The control unit 200 stores a drive condition of the laser light source in the drive condition buffer 201 when the output light amount becomes the target amount by APC in the case that the target light amount is a prescribed light amount which has been previously prescribed (Step S204).

FIG. 5A is an explanatory view explaining drive conditions stored in the drive condition buffer 201. A graph 500 of FIG. 5A, the vertical axis represents the light amount and the horizontal axis represents drive voltage. The control unit 200 determines the drive voltage after APC as a drive condition to be stored in the buffer when the target light amount is a prescribed light amount which has been previously prescribed. For example, the control unit 200 determines a drive voltage $V_0$ of the laser light source when the target light amount is a prescribed light amount $P_0$, a drive voltage $V_1$ when the target light amount is a prescribed light amount $P_1$, a drive voltage $V_2$ when the target light amount is a prescribed light amount $P_2$, a drive voltage $V_3$ when the target light amount is a prescribed light amount $P_3$ and a drive voltage $V_4$ when the target light amount is a prescribed light amount $P_4$ as drive conditions to be stored in the drive condition buffer 201 as shown in the graph 500.

FIG. 5B is an explanatory views illustrating drive conditions of the laser light source 210 stored in the drive condition buffer 201. As shown in FIG. 5B, drive voltages $V_0$ to $V_4$ at the time of outputting respective prescribed light amounts are stored in the drive condition buffer 201 with respect to the predetermined prescribed light amounts $P_0$ to $P_4$ as described in FIG. 5A. The control unit 200 calculates slope efficiency of the laser light source by using drive conditions stored in the drive condition buffer 201. The slope efficiency is calculated by the increasing amount ΔP of the output light amount/the increasing amount ΔV of the drive voltage as shown in FIG. 5A.

Returning to FIG. 3, explanation of processing will be continued. The control unit 200 calculates the slope efficiency by using the output light amounts and drive conditions stored in the drive condition buffer (Step S206) and determines deterioration of the laser light source by using the calculated slope efficiency and the predetermined reference range (Step S208).

FIG. 6 is an explanatory view explaining deterioration determination of the laser light source device according to First Embodiment. In a graph 600 of FIG. 6, the vertical axis represents the light amount and the horizontal axis represents drive voltage. A reference slope efficiency 610 represents the slope efficiency of the laser light source device at the time of normal operation. In First Embodiment, it is determined that the laser light source device deteriorates when the slope efficiency is not included in a prescribed range in which the reference slope efficiency is taken as a reference (hereinafter, referred to as a reference conversion efficiency range in First Embodiment) 650. The reference conversion efficiency range 650 may be the range of approximately ±10% of the reference slope efficiency.

The slope efficiency 620 represents the slope efficiency calculated based on a drive condition stored at a prescribed timing. In the slope efficiency 620, for example, a drive voltage $V_1'$ is necessary for outputting the prescribed light amount $P_1$, and a drive voltage $V_2'$ is necessary for outputting the prescribed light amount $P_2$. The drive voltages $V_1', V_2'$ are higher than the drive voltages $V_1, V_2$ with respect to the target light amounts $P_1, P_2$ of the reference slope efficiency 610. The slope efficiency 620 at that time is not included in the reference conversion efficiency range 650 as shown in FIG. 6. The control unit 200 determines that the laser light source device deteriorates in the case that the calculated slope efficiency is not included in the reference conversion efficiency range 650.

The drive conditions stored in the drive condition buffer 201 are the latest drive conditions with respect to the prescribed light amounts $P_0$ to $P_4$ which have been previously prescribed. That is, the storage contents of the drive condition buffer 201 are appropriately updated. It is preferable that the calculation of the slope efficiency is performed when drive conditions with respect to all prescribed light amounts prescribed in the drive condition buffer 201 have been calculated or it is performed when at least two drive conditions are stored. The calculation timing of the slope efficiency is a matter which is optionally set by a user. The more drive conditions exist, the higher the accuracy of slope efficiency becomes.

When it is determined that the laser light source device deteriorates (Step S208), the control unit 200 calculates the maximum light amount (the light amount $P_{max0}$ as shown in FIG. 6) which can be outputted by the laser light source device in the deteriorated state and transfer the light amount to the video processing circuit 100 (Step S210).

The video processing circuit 100 determines whether the maximum light amount has been acquired from the control unit 200 (Step S108). When the maximum light amount has been acquired (Yes: Step S108), the video processing circuit 100 calculates the light amount of 70% of the maximum light amount as the maximum control light amount, determining whether there is change in the maximum control light amount (Step S110). The video processing circuit 100, when determining that there is change in the maximum control light amount (Yes: Step S110), updates the maximum control light amount (Step S112). In this case, when there is change in the maximum control light amount with respect to at least one of laser lights of respective colors, in conjunction with the maximum control light amount of the laser light source (hereinafter, referred to as a reference laser light source) whose rate of change (reduction rate) of the maximum control light amount with respect to a given operation which has been previously prescribed (for example, at the time of activation or at the time of normal operation) is maximum, the maximum control light amounts of laser light sources other than the reference laser light source is changed so that the white balance of the output light from the laser light of respective colors is maintained to be a fixed state.

The video processing circuit 100 sets the target light amount of the inputted frame in accordance with the updated maximum control light amount.

When APC is performed at the target light amount calculated based on the maximum control light amount before deterioration at the time of deterioration of the laser light source device, overvoltage is applied to the laser light source device so as to satisfy the target light amount. For example, when APC is performed at the target light amount $P_1$ calculated based on the maximum control light amount before deterioration at the time of deterioration as shown in FIG. 6, the drive voltage $V_1'$ which is higher than the drive voltage $V_1$ for outputting the target light amount $P_1$ at the normal operation is applied. Due to the application of the overvoltage in this manner, the laser light source device is liable to be damaged. In order to avoid the damage, the application of overvoltage to the laser light source device is suppressed by updating the maximum control light amount of the video processing circuit based on the maximum light amount which can be outputted by the deteriorated laser light source when deterioration of the laser light source is detected in the present embodiment.

As shown in FIG. 4, the video processing circuit 100, when plural drive conditions are not stored in the drive condition buffer (Step S150 (No: Step S102)), performs color conversion processing including calculation of the white balance and $\gamma$ correction (Step S152) and transfer the target light amount calculated in Step S100 to the control unit 200 (Step S154).

The control unit 200, when acquiring the target light amount (Step S250), performs APC by using the target light amount and the output light amount acquired from the I/V converter 261 (Step S252). The control unit 200 stores the drive condition of the laser light source device after the APC in the buffer (Step S254).

According to the projector of First Embodiment, the deterioration state of the laser light source device can be caught by using drive conditions of the drive circuit with respect to at least two target light amounts. When just one drive condition is used as determination information for deterioration, the accuracy of determination results is not high because different drive condition may be calculated with respect to a given target light amount at different timing due to noise. However, according to the projector of First Embodiment, the determination of deterioration is performed based on change characteristics (slope efficiency) of drive conditions by using drive conditions with respect to respective different target light amounts, therefore, the determination of deterioration can be performed with high accuracy. Also according to the projector of First Embodiment, it is possible to update the maximum control light amount of the laser light source device in which APC is possible in accordance with the deterioration state of the laser light source device. Therefore, voltage application exceeding the allowable range to the drive circuit of the laser light source can be suppressed as well as failures of the laser light source device can be suppressed. As a result, the useful life of the laser light source device can be prolonged. The projector according to First Embodiment is preferable in the case that video whose maximum light amount changes according to respective frames such as movies or television programs.

In addition, according to the projector of First Embodiment, the output from all colors of the laser light source devices can be controlled so as to maintain the white balance of the output lights from the laser light source devices of three colors to be a fixed state. Therefore, the deterioration of image quality of video can be suppressed as well as the reduction of visibility for an observer can be suppressed.

According to the projector of First Embodiment, the drive condition of the laser light source after the APC can be stored in the drive condition buffer only when the target light amount is the prescribed light amount which has been previously prescribed. Therefore, it is possible to save the memory and reduce processing burden when compared with the case of storing drive conditions with respect to all target light amounts. The slope efficiency is calculated by using drive conditions with respect to the light amounts of more than prescribed kinds, thereby calculating the slope efficiency with accuracy not inferior to the case of storing all drive conditions.

According to the projector of First Embodiment, the laser diode is used as the light source, therefore, images can be displayed in a wide color range. In addition, since the pixel information (luminance signal) of the frame is inputted to both the light source device and the spatial light modulation device, the contrast ratio can be large to display brilliant video.

B. Second Embodiment

In Second Embodiment, the maximum control light amount is updated by using a characteristic table in which the slope efficiency in the normal operation, the slope efficiency at the time of deterioration and the maximum light amounts in respective slope efficiencies are previously stored by being associated. The structure of the projector according to Second Embodiment is the almost the same as First Embodiment. However, in the control unit 200 of Second Embodiment, a characteristic table is stored instead of the reference conversion efficiency range.

B1. Characteristic Table

Figure 7:
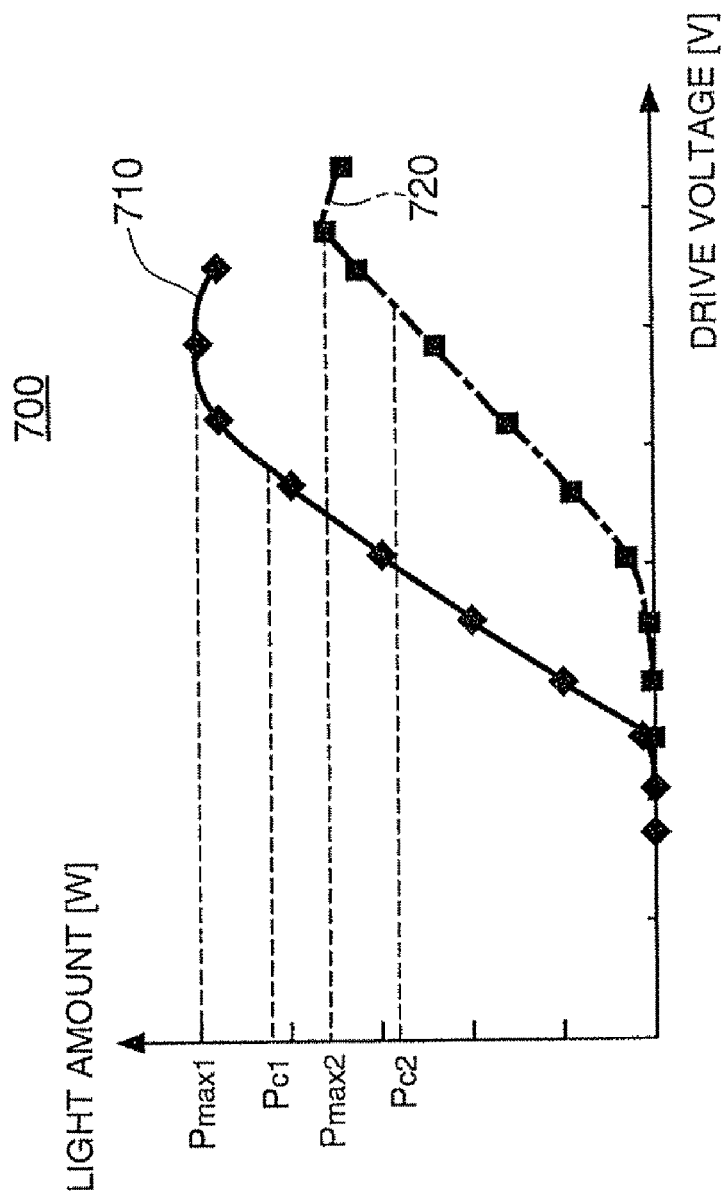
FIG. 7 is an explanatory view illustrating a characteristic table according to Second Embodiment.

FIG. 7 is an explanatory view illustrating a character table according to Second Embodiment. In the characteristic table 700, a slope efficiency 710 at the time of normal operation, a slope efficiency 720 at the time of deterioration, the maximum light amount $P_{max1}$ at the normal operation and the maximum light amount $P_{max2}$ at the time of deterioration are stored. In the characteristic table 700, the vertical axis represents the light amount and the horizontal axis represents drive voltage. The video processing circuit 100 of the projector calculates target light amounts at the maximum control light amounts $Pc_1$, $Pc_2$ which are approximately 70% of the maximum light amounts $P_{max1}$, $P_{max2}$.

The control unit 200 acquires the maximum light amount which can be oscillated by the laser light source device at the time of deterioration from the characteristic table 700 when the laser light source device deteriorates, and transfer the light amount to the video processing circuit. For example, the control unit 200, when detecting deterioration of the laser light source device, refers to the characteristic table 700 and transfers the maximum light amount $P_{max2}$ of the laser light source device at the time of deterioration to the video processing circuit 100. In Second Embodiment, for example, it may be determined that the laser light source device deteriorates when the application of overvoltage is detected. When the deterioration is detected at plural laser light source devices, the maximum light amount of the laser light source whose reduction rate of the maximum light amount is largest is transferred.

The video processing circuit 100 updates the maximum control light amount set in the light detection circuit based on the maximum light amount received from the control unit 200. At this time, the maximum control light amounts of other laser light sources are also updated in conjunction with the updated maximum control light amount so as to maintain the white balance to be a fixed state.

According to the projector of Second Embodiment which has been described above, the maximum light amount which can be oscillated by the deteriorated laser light source device can be acquired by using the characteristic table which has been previously prescribed. Therefore, it is possible to update the maximum control light amount dynamically and rapidly in accordance with the deterioration state, therefore, failures of the laser light source device can be suppressed as well as useful life can be prolonged.

C. Third Embodiment

In Third Embodiment, a calculation method of the slope efficiency when variation of the maximum light amount in respective frames is small such as display of still images or presentation material as well as resetting processing of the maximum control light amount in the video processing circuit will be explained.

C1. Function Blocks

Figure 8:
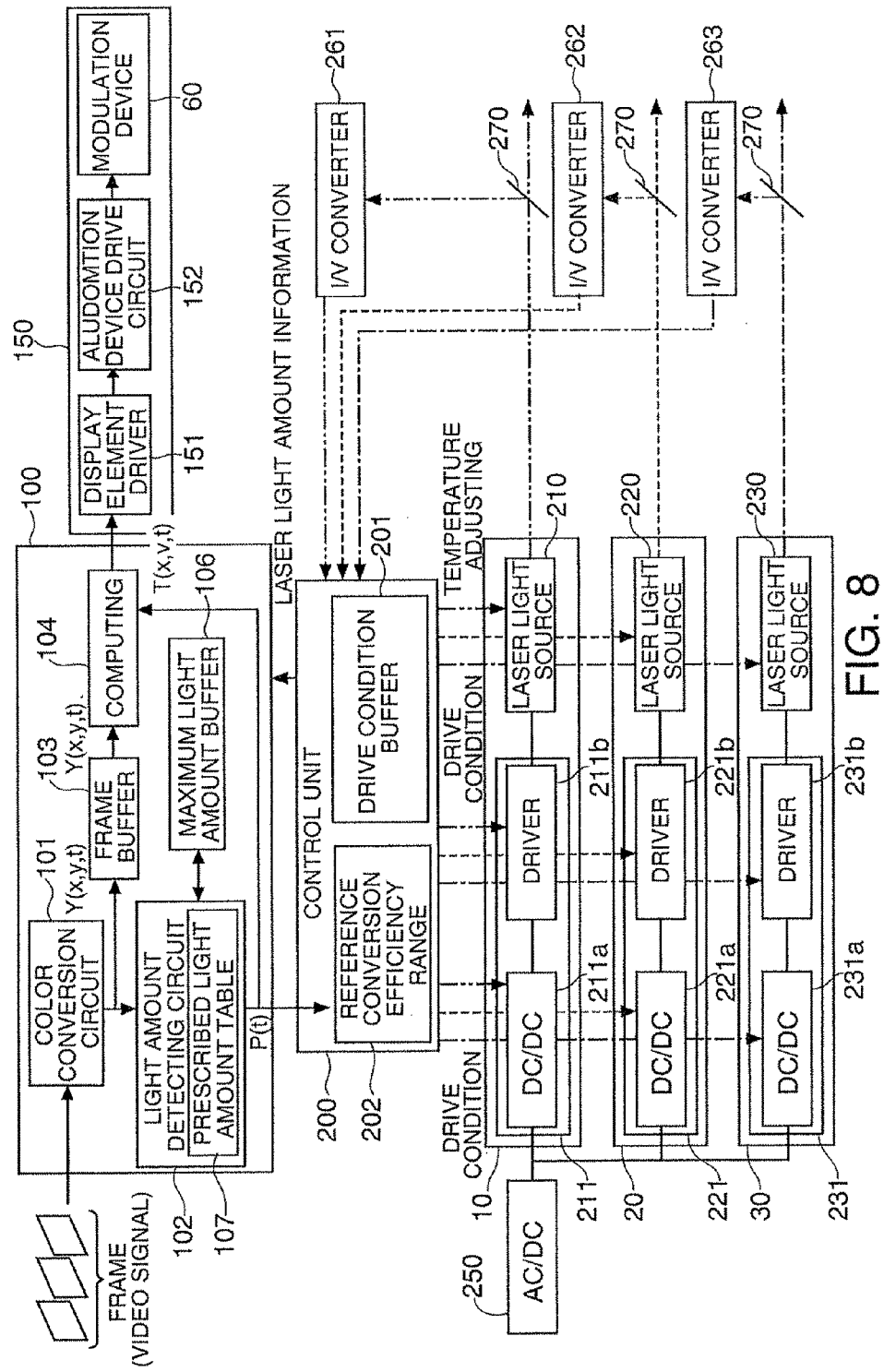
FIG. 8 is a block diagram illustrating a projector and function blocks according to Third Embodiment.

FIG. 8 is a block diagram illustrating a projector and functional blocks according to Third Embodiment. The structure of the projector according to Third Embodiment is almost the same as First Embodiment. However, the video processing circuit 100 of the projector according to Third Embodiment includes a maximum light amount buffer 106 temporarily storing the maximum light amount of a frame just before and a prescribed light amount table 107 in which a prescribed light amount previously prescribed as a target light amount of a black frame is set.

C2. Concerning Insertion of the Black Frame

Figure 9:
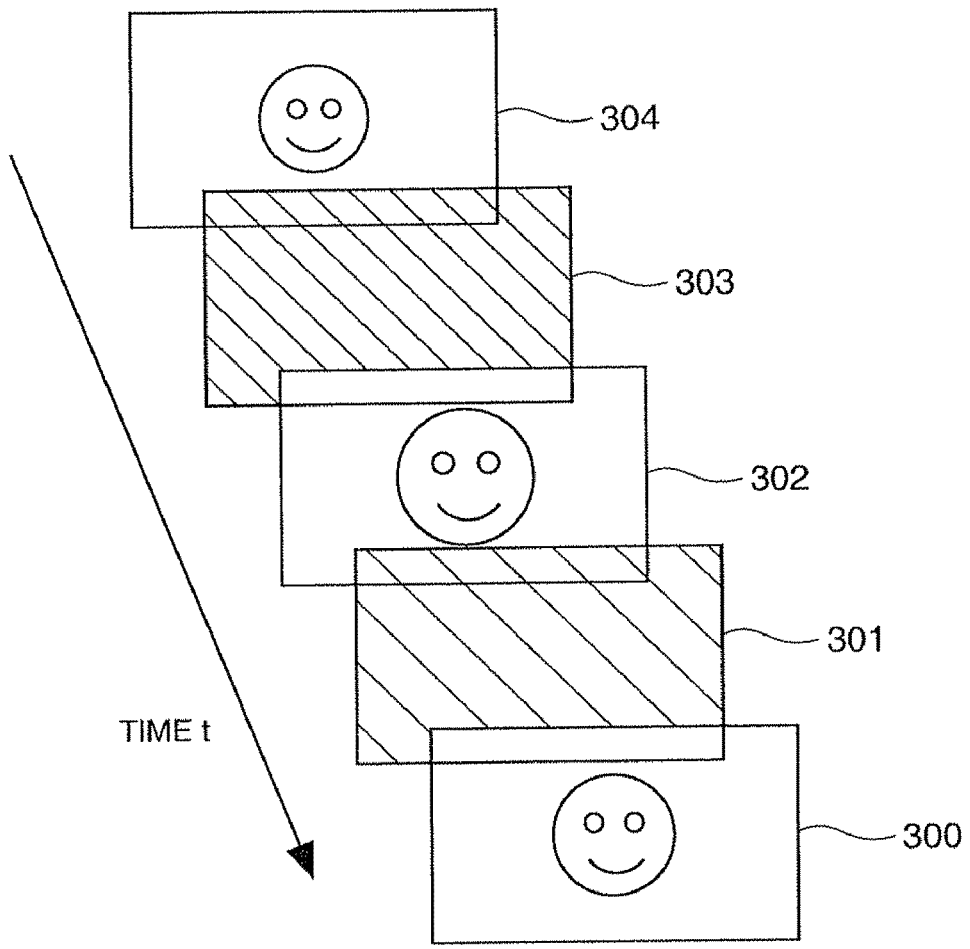
FIG. 9 is an explanatory view illustrating part of frames according to Third Embodiment.

FIG. 9 is an explanatory view illustrating part of frames according to Third Embodiment. Time "t" represents lapsed time. In the same manner as First Embodiment, a video signal is inputted by each frame from the image generating device to the projector. For example, a frame 301 is inputted after a frame 300, and a frame 302 is inputted after the frame 301. In Third Embodiment, frames 301, 303 in which pixel values are set so that all pixels will be black are inserted between frames 300 and 302, between frames 302 and 304. In the following description, frames for displaying images are referred to as normal frames and frames set so that all pixels will be black are referred to as black frames.

C3. Maximum Control Light Amount Resetting Processing

Figure 10:
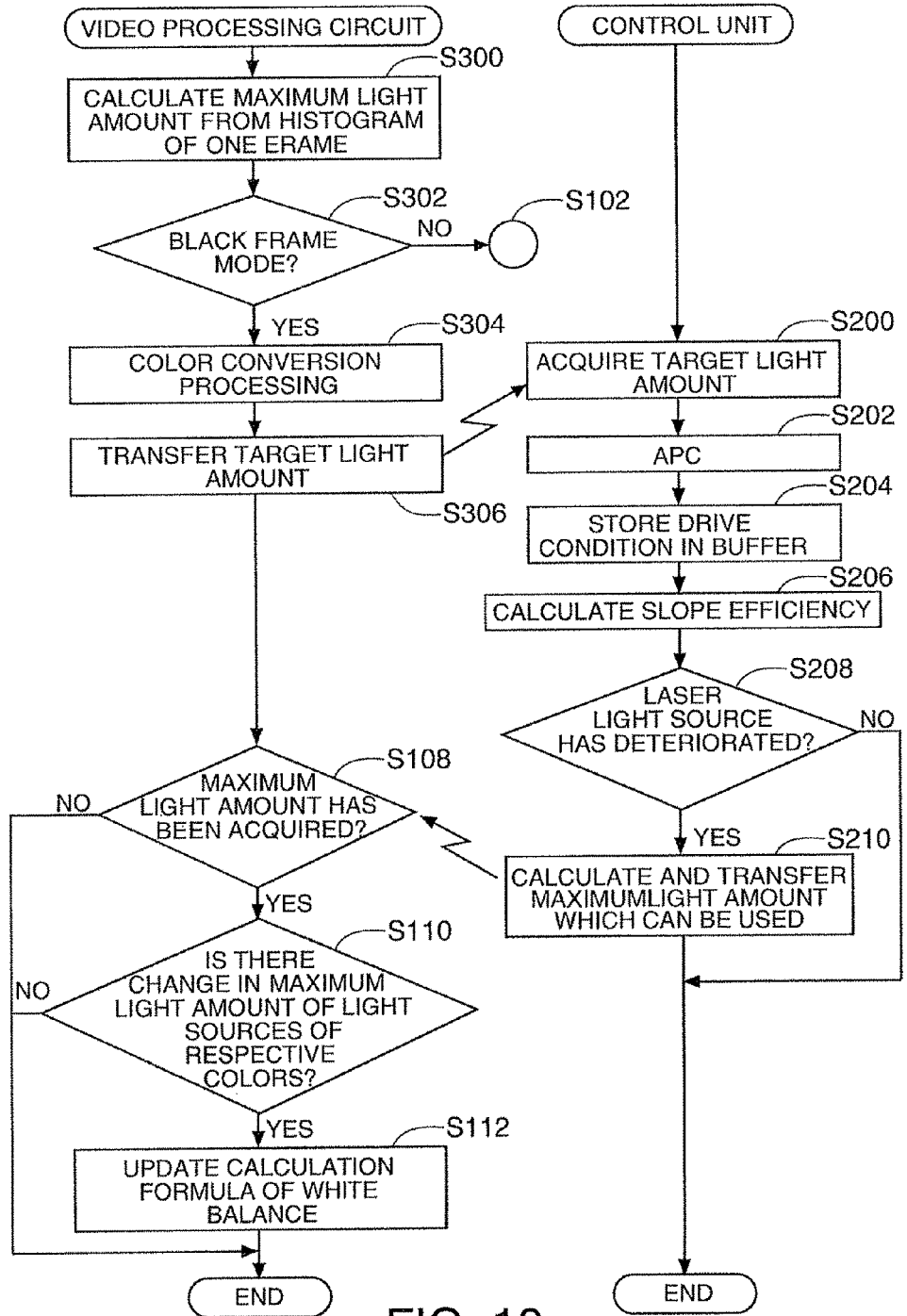
FIG. 10 is a flowchart explaining maximum control light amount resetting processing according to Third Embodiment.

FIG. 10 is a flowchart explaining resetting processing of the maximum light amount according to Third Embodiment. The video processing circuit 100 calculates a target light amount of a frame based on a histogram indicating luminance distribution of luminance values of pixel data included in one frame, storing target light amounts of respective frames in the buffer (Step S300). The video processing circuit 100 determines whether inputted plural frames includes a black frame by using the target light amounts stored in the target light amount buffer (Step S302). Specifically, when a difference H between the maximum light amount $P_{max(t-1)}$ of the frame just before and the maximum light amount $P_{max(t)}$ of the present frame is included in a prescribed range as shown by the following formula 2, it is determined that the black frame is included. The case in which black frame is inserted is referred to as a black frame mode and the case in which the black frame is not inserted is referred to as a normal mode.

$$-\alpha < H = P_{max(t-1)} - P_{max(t)} < \alpha \qquad \text{Formula 2}$$

The video processing circuit 100 performs color conversion processing including calculation of the white balance and the γ correction (Step S304) in the case of the black frame mode (Yes: Step S302), transfers the target light amount to the control unit 200 (Step S306). The video processing circuit 100 performs processing after Step S102 explained in First Embodiment in the case of the normal mode (No: Step S302).

The target light amount to be transferred to the control unit 200 of the laser light source device at the time of inputting the black frame will be explained with reference to FIG. 11. FIG. 11 is an explanatory view illustrating prescribed light amounts at the time of inserting the black frame according to Third Embodiment. As shown in FIG. 11, the order of black frame insertion and prescribed light amounts are stored in the prescribed light amount table 107. For example, a prescribed light amount $P_{11}$ is associated with a black frame $BF_1$ which is inserted first.

The video processing circuit 100, when the inputted frame is a black frame, transfers the prescribed light amount previously prescribed to the control unit 200 as a target light amount of the black frame. For example, the video processing circuit 100, when the black frame 301 is the black frame which has been inserted first, transfers the prescribed light amount $P_{11}$ to the control unit 200 as the target light amount.

Returning to FIG. 10, explanation will be continued. The processing after transfer of the target light amount is the same as the processing of First Embodiment. That is, the processing of the control unit 200 is the same as the processing explained in First Embodiment. The control unit 200, when acquiring the target light amount (Step S200), performs APC by using the target light amount and an output light amount of the laser source (Step S202). When the target light amount is the prescribed light amount which has been previously prescribed, the control unit 200 stores a drive condition of the laser light source when the output light amount becomes the target light amount by APC in the drive buffer 201 (Step S204), calculating the slope efficiency by using drive conditions stored in the drive condition buffer 201 (Step S206). The explanation of processing after the calculation of the slope efficiency in Step S206 (including processing after Step S108 of the video processing circuit 100) will be omitted.

When the inputted frame is the black frame, the display element driver controls so that the light valve is displayed in black. Accordingly, an image displayed at the time of inputting the black frame will be a black image in which all pixels are black, however, APC with respect to a prescribed target light amount is performed inside the projector and drive conditions with respect to plural kinds of light amounts can be acquired.

According to the projector of Third Embodiment explained as the above, it is possible to calculate the slope efficiency by intentionally inserting the black frame between frames and acquiring the drive condition for outputting the prescribed light amount at the time of inserting the black frame. Therefore, even when video whose luminance variation between frames is relatively small is displayed, for example, at the time of displaying still images or presentation material, the deterioration of the laser light source device can be determined as well as user-friendliness can be improved.

D. Modification Example

1. In First Embodiment, when the slope efficiency calculated by using drive conditions with respect to five different kinds of target light amounts is not included in the reference conversion efficiency range, it is determined that the laser light source device deteriorates, however, it is also preferable that a gradient is calculated from drive conditions of the drive circuit with respect to at least two different kinds of target light amounts to determine the deterioration. Accordingly, it is possible to determine the deterioration by comparing with a drive condition of a prescribed time or the gradient of the drive condition of a prescribed time. It is also preferable to determine the deterioration by comparing the gradient calculated from drive conditions of the drive circuit with respect to at least two different kinds of target light amounts with the drive condition of a prescribed time or it is preferable to determine the deterioration by comparing the gradient calculated from drive conditions of the drive circuit with respect to at least two different kinds of target light amounts with the gradient calculated from the drive condition of a prescribed time.

2. In First Embodiment to Third Embodiment, the maximum control light amount of the laser light source devices of all colors is updated in conjunction with the light source amount whose reduction ratio at the normal state is largest in red laser light source device, the blue laser light source device and the green laser light source device, however, it is also preferable to update the maximum control light amount of the laser light source devices of all colors in conjunction with the reduction ratio of the laser light source device of any one color which has been previously determined. For example, it is preferable to adjust the maximum control light amount of other light sources in conjunction with the laser light source device having high temperature dependence. Since the red laser light source has high temperature dependence, light sources of other colors may be adjusted in conjunction with the red laser light source device. Accordingly, it is possible to maintain the white balance to be a fixed state efficiently by a simple configuration.

3. The above video display device including various laser light source device can be applied to, in addition to the projector, an image display device, a monitor device and an illumination device. The above various embodiments can be approximately combined or part of embodiments can be omitted.

4. In First Embodiment to Third Embodiment, the white balance is adjusted by the light amount of the laser light source, however, it is preferable that the white balance is adjusted by using the light valve. It is also preferable that the white balance is adjusted by controlling both the laser light source and the light valve.

Various embodiments of the invention have been explained as the above, however, the invention is not limited to the above embodiments and can be variously configured in a scope not departing from the gist thereof.

The entire disclosure of Japanese Patent Application No. 2007-322266, filed Dec. 13, 2007 is expressly incorporated by reference herein.

What is claimed is:

1. A laser light source device which is used for a video display device displaying video by using plural image frame data inputted from an image generating device, comprising:
   a laser light source emitting laser light;
   a drive circuit driving the laser light source;
   a target light amount acquisition unit that acquires a target light amount which is a light amount necessary for displaying the image frame data;
   an output light amount detecting unit that detects an output light amount of the laser light source device;
   a control unit that controls the drive circuit so that the output light amount will be the target light amount; and
   a determination unit that determinates deterioration of the laser light source by using drive conditions of the drive circuit with respect to at least two different target light amounts at the time of control.

2. The laser light source device according to claim 1, wherein the determination unit determines the deterioration when the drive conditions with respect to the target light amounts are not included in a reference conversion efficiency range which has been previously prescribed.

3. The laser light source device according to claim 2, further comprising:
   a storage unit that stores plural drive conditions; and
   a calculation unit that calculates slope efficiency indicating output efficiency of the laser light source by using plural drive conditions stored in the storage unit, and
   wherein the reference conversion efficiency range is a prescribed range including a reference slope efficiency which has been previously prescribed, and
   wherein the determination unit determines deterioration when the calculated slope efficiency is not included in the reference conversion efficiency range.

4. The laser light source device according to claim 3, further comprising:
   a decision unit that decides whether the drive conditions with respect to respective plural kinds of light amounts which have been previously prescribed are stored in the storage unit, and
   wherein the calculation unit performs calculation of the slope efficiency in the case that at least two drive conditions are stored.

5. The laser light source device according to claim 1, wherein the drive condition includes a voltage value or a current value which is necessary for outputting laser light.

6. A video display device, comprising:
the laser light source device according to claim 1;
an image frame data acquisition unit that acquires plural image frame data from an image generating device;
a target light amount calculation unit that calculates a target light amount which is a light amount necessary for displaying the image frame data;
a transfer unit that transfers the target light amount to the laser light source device; and
a video display unit that displays video by using the acquired image frame data and output light from the laser light source controlled in accordance with the target light amount.

7. The video display device according to claim 6, further comprising:
a maximum light amount acquisition unit that acquires the maximum light amount which can be outputted by the laser light source by using output light amounts of the laser light source and a characteristic table in which drive conditions necessary for outputting prescribed light amounts are previously registered in accordance with the deterioration state of the laser light source device, and
wherein the target light amount calculation unit calculates the target light amount to be transferred to the laser light source based on the acquired maximum light amount.

8. The video display device according to claim 6, wherein a red laser light source device for outputting red light, a green laser light source device for outputting green light and a blue laser light source device for outputting blue light are included as the laser light source device, and
wherein the target light amount calculation unit calculates the target light amount so that the white balance of output lights from the respective laser light source devices is maintained to be a fixed state.

9. The video display device according to claim 8, wherein the output light amount acquisition unit acquires output light amounts of the respective laser light sources, and
wherein the target light amount calculation unit calculates the target light amounts of the laser light sources of respective colors so that the white balance of output lights from the laser light sources of respective colors is maintained to be a fixed state in accordance with the output light amount of the laser light source whose reduction ratio of the acquired output light amount is largest with respect to the output light amount at a previously prescribed certain point in the laser light sources of respective colors.

10. The video display device according to claim 6, further comprising:
a black frame decision unit that decides whether the image data frame transmitted from the image generating device is a black frame in which all pixel data is set to be black, and
wherein the laser light source device further includes a storage unit that stores a prescribed drive condition which is a previously prescribed drive condition of the laser light source device when it is determined that the frame is the black frame, and a calculation unit that calculates slope efficiency by using the prescribed drive condition.

11. The video display device according to claim 10 further comprising:
a light amount storage unit that stores the maximum light amount of each image data frame acquired by the maximum light amount acquisition unit, and
wherein the black frame decision unit makes a decision by using the maximum light amount of each image data frame stored in the light amount storage unit.

12. A deterioration determination method determining deterioration of a laser light source device used for a video display device which displays video by using plural image frame data inputted from an image generation device, comprising:
supplying power for driving the laser light source device;
acquiring a target light amount which is a light amount necessary for displaying the image frame data;
acquiring an output light amount of the laser light source device;
controlling a drive circuit which supplies power for driving the laser light source device so that the output light amount will be the target light amount; and
determining deterioration of the laser light source device by using drive conditions of the drive circuit with respect to at least two different target light amounts at the time of control.

13. A control method performed by a video display device which displays video by using the laser light source device, comprising:
acquiring the maximum light amount which can be outputted by the laser light source device in accordance with the deteriorated state of the laser light source device;
acquiring plural image frame data from an image generating unit;
calculating a target light amount which is a light amount necessary for displaying the image frame data by using the acquired maximum light amount; and
controlling output of the laser light source device by using the calculated target light amount.

* * * * *